United States Patent
Meneghetti

(10) Patent No.: US 6,173,920 B1
(45) Date of Patent: Jan. 16, 2001

(54) VERY LARGE AIRCRAFT LANDING GEAR HAVING EIGHT WHEEL TRUCK

(75) Inventor: Michael J. Meneghetti, Blaine, WA (US)

(73) Assignee: The Boeing Company, Seattle, WA (US)

( * ) Notice: Under 35 U.S.C. 154(b), the term of this patent shall be extended for 0 days.

(21) Appl. No.: 08/821,369

(22) Filed: Mar. 20, 1997

Related U.S. Application Data

(63) Continuation-in-part of application No. 08/696,448, filed on Aug. 13, 1996, now abandoned, which is a continuation-in-part of application No. 08/352,337, filed on Dec. 8, 1994, now Pat. No. 5,743,491.

(51) Int. Cl.[7] .................................................. B64C 25/00
(52) U.S. Cl. ................. 244/100 R; 244/103 R; 244/104 R; 244/102 R; 244/102 A
(58) Field of Search ............................ 244/100 R, 102 R, 244/102 A, 102.55, 104 R, 104 FP, 104 CS

(56) References Cited

U.S. PATENT DOCUMENTS

| | | | |
|---|---|---|---|
| 2,487,548 | * 11/1949 | Hawkins, Jr. | ................ 244/104 FP |
| 2,538,388 | * 1/1951 | Sievers . | |
| 2,851,231 | * 9/1958 | Westcott, Jr. . | |
| 3,091,416 | * 5/1963 | Knights et al. . | |
| 3,315,919 | * 4/1967 | Perdue | .............................. 244/102 R |
| 3,904,153 | 9/1975 | Watts | ................................ 244/103 W |
| 4,749,152 | * 6/1988 | Veaux et al. | ................... 244/104 FP |
| 4,770,372 | * 9/1988 | Ralph | ............................. 244/104 FP |
| 5,110,068 | * 5/1992 | Grande et al. | ................. 244/102 SL |
| 5,110,826 | 5/1992 | Grande et al. | ................. 244/102 SL |
| 5,242,131 | * 9/1993 | Watts | ............................... 244/103 W |
| 5,263,664 | * 11/1993 | Derrien et al. | ................... 244/102 A |
| 5,279,480 | * 1/1994 | Derrien | ........................... 244/104 FP |
| 5,310,140 | * 5/1994 | Veaux et al. | ................... 244/104 FP |
| 5,337,976 | 8/1994 | Derrien | ............................ 244/102 A |
| 5,743,491 | * 4/1998 | Meneghetti | .................... 244/104 FP |

FOREIGN PATENT DOCUMENTS

| | | |
|---|---|---|
| 0 713 826 | 5/1996 | (EP) . |
| 820 217 | 9/1959 | (GB) . |
| 2 101 542 | 1/1983 | (GB) . |

\* cited by examiner

Primary Examiner—William A. Cuchlinski, Jr.
Assistant Examiner—Yonel Beaulieu
(74) Attorney, Agent, or Firm—Conrad O. Gardner

(57) ABSTRACT

Very large aircraft landing gear using single mounted eight wheel bogie on dual shock struts. A primary or main two-stage shock absorber and a semi-articulating secondary or auxiliary single-stage shock absorber, each of which are mounted using the second and third axles as pivot joints in a four axle, eight wheel truck beam.

6 Claims, 7 Drawing Sheets

ASSUMING THAT THE SHOCK ABSORBER(S) IS PERPENDICULAR TO THE GROUND AND THE AIRCRAFT IS MOTIONLESS,

THE EQUATION IS:

$P = \dfrac{F}{A}$   WHERE: $P$ = SHOCK ABSORBER INTERNAL PRESS.
   $F$ =  "   "   VERTICAL LOAD
   $A$ =  "   "   INTERNAL HYDRAULIC AREA

*Fig. 8A.*

IN TERMS OF WIDTH COMPARISON:

FIG. 8A. SINGLE SHOCK ABSORBER        FIG. 8B TWO SHOCK ABSORBERS

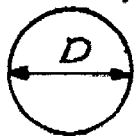   $A = \dfrac{\pi D^2}{4}$         $A_1 = \dfrac{\pi D_1^2}{4}$, $P_1 = \dfrac{F_1}{A_1}$

VERSUS $P = \dfrac{F}{A}$        $A_2 = \dfrac{\pi D_2^2}{4}$, $P_2 = \dfrac{F_2}{A_2}$

WHERE: $P = P_1 = P_2$, $D_1 = D_2$ AND $F_1 = F_2$

*Fig. 8B.*

THUS SINCE BOTH FIG. 8A. AND 8.B. HAVE EQUAL LOADING (SAME TOTAL WHEEL CAPACITY), $F = F_1 + F_2 = 2F_1$, OR $PA = 2P_1 A_1$

IN TERMS OF DIAMETERS, $A = 2A_1$

OR, $D^2 = 2D_1^2$ $D = \sqrt{2}\, D_1 \cong 1.414 D_1$

*Fig. 8C.*

VERY LARGE AIRCRAFT LANDING GEAR HAVING EIGHT WHEEL TRUCK

RELATED APPLICATIONS

This application is a continuation-in-part of application Ser. No. 08/696,448, filed Aug. 13, 1996 abandoned which is a continuation-in-part of application Ser. No. 08/352,337 filed Dec. 8, 1994, now U.S. Pat. No. 5,743,491.

BACKGROUND OF THE INVENTION

Problem: In very large aircraft applications, conventional four wheel per post (shock strut) installations require greater stowage volume and may be heavier than desirable due to the fact that a great number of posts are needed together with their supporting structure. Conversely, for a given number of tires, if fewer posts are used, the individual shock strut sizes (diameter and length) must be increased because of higher loads per post and hence require a wider wheel base and usually a longer than desirable wheel well.

Attempts to develop an eight wheel bogie stem from development of a six-wheel bogie (see FIG. 1) with one shock strut mounted on the center axle pivot. However, an eight wheel bogie geometry with a single shock absorber does not permit convenient mounting of the shock strut on one of the axles and requires a separate pivot, otherwise asymmetric loading of the tires would be the result. Studies indicate that a separate pivot results in a weight penalty. Furthermore, evaluation of a single shock strut on eight wheels for application to large aircraft results in a very large shock absorber which current technology may find difficult to build. And finally, the physical size of this arrangement results in poor kinematic retraction which requires the same if not more stowage volume and will typically expose more frontal area to the effects of aerodynamic drag (noise and loads) than the separate four wheel installations which it is supposed to replace. Attempts to reduce the shock strut size and take advantage of the weight saving pivot/axle feature by using twin shock struts failed because the struts were fixed rigid to each other and the resulting kinematic action prevented a simple means of incorporating truck pitch attitude control done by a separate external actuator/damper as shown in FIG. 1.

SUMMARY OF THE INVENTION

A very large aircraft landing gear utilizing an eight wheel truck. A primary two-stage shock absorber and an auxiliary single-stage shock absorber eliminating the need for torque links as seen in the landing gear of FIG. 1.

It is accordingly an object of this invention to provide landing gear for large aircraft which permits desired truck beam pitch attitude and "soft" damping loads at the initial contact of tires to ground during landing.

It is a further object of this invention to replace two separately mounted (on the aircraft) four wheel bogie shock struts with a single mounted, eight wheel bogie on dual shock absorbers.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIGS. 8A, B and C are a series of equations and supporting figures showing Pressure, Load and Hydraulic Area relationships between a single shock absorber and two, separate shock absorbers. These are used to support the argument that two absorbers have reduced diametral width over a single absorber as discussed previously;

GENERAL DISCUSSION OF THE PRIOR ART

Figure 1:
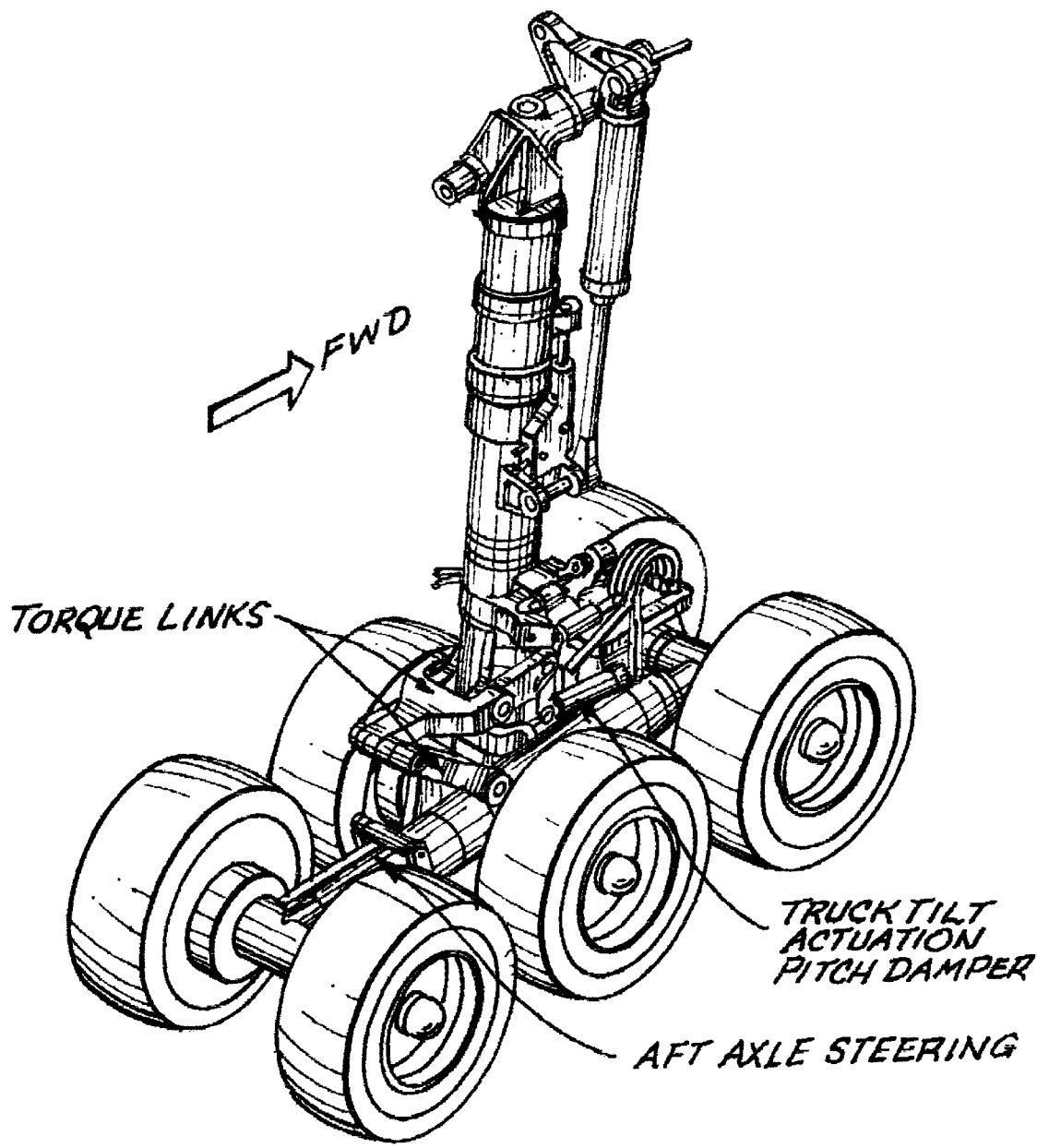
FIG. 1 is an isometric view illustrative of a six wheel truck assembly.

U.S. Pat. No. 4,749,152 to Veaux et al.

The object of Veaux et al. is to change the lengths of the gear when the aircraft is going through its different operating conditions. This is done by external means (40, 41) relative to the 3-bar linkage comprised of 20, 24 and 8. Whereas the present invention does not use separate linkages; the 4-bar design provides inherent pitch control during all conditions of ground maneuvering, retraction and extension.

In terms of energy absorption, Veaux et al. uses a two-stage approach, however in terms of kinematics, the Veaux et al. shock strut uses a sliding tube (item 14) as well which makes for a total of three telescoping components (11, 14 and 18) all three being integrated and sliding with respect to each other whereas, the present invention uses only two integrated telescoping members 8 and 9 for the main shock absorber 1 with the third member 2 being physically separate and also absorbing energy thus making for a three-stage energy absorption in terms of the preferred embodiment which is not the case for the Veaux et al. sliding tube. In terms of energy absorption, similarity with the Veaux et al. system exists if the primary stage piston 8A is replaced with the alternate sliding tube 8B, however, in terms of kinematic performance, the use of tube 8B does not change the argument for dissimilarity. To further this argument, the Veaux et al. sliding tube (item 14) does not, nor is intended, to replace one of the two stages of the shock absorber whereas the present invention replaces the first stage of the two-stage main absorber in order to maintain the equivalent kinematic action of the original preferred embodiment.

Veaux et al. states that a purpose of the invention is to "realize an undercarriage having one single shock absorber . . . " (col. 1, line 47) whereas, in the present approach the purpose is not to use one but rather two separate shock absorbers to perform the same functions because there are advantages as already discussed, but only when dealing with an eight wheel truck design.

Figure 4:
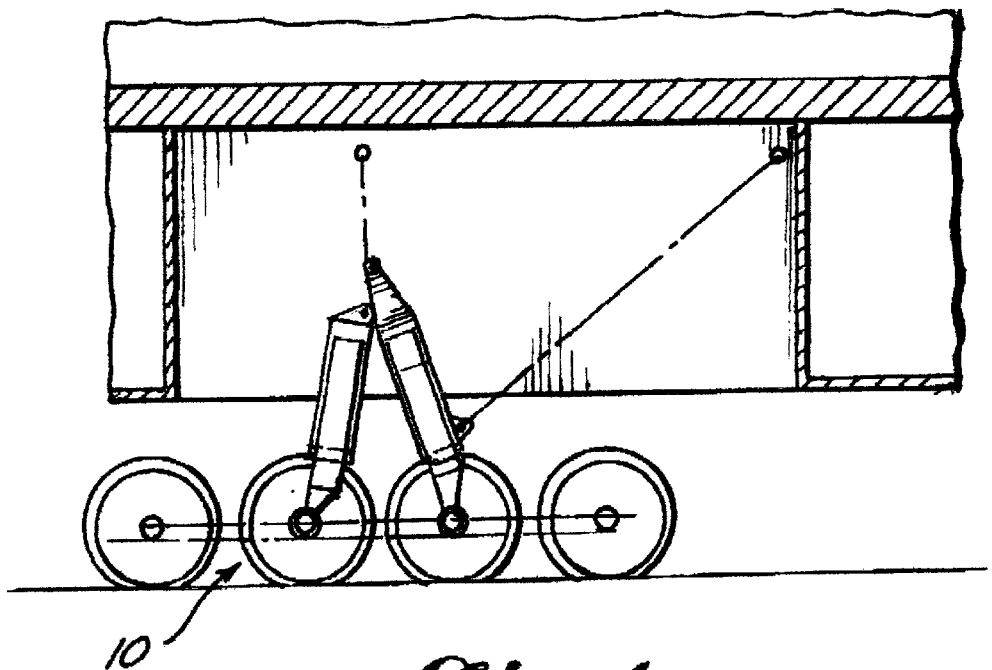
FIG. 4 is illustrative of the eight wheel truck assembly of FIG. 2 at static ground line position.
Figure 5:
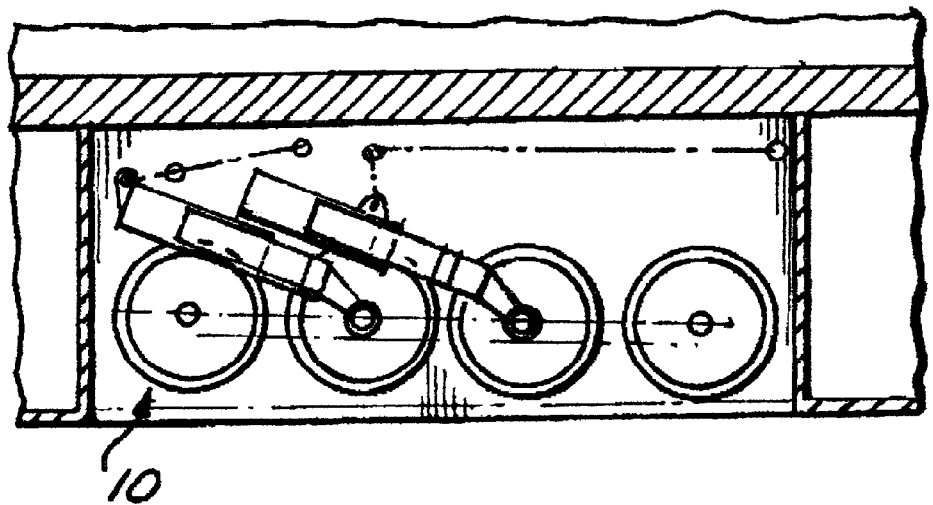
FIG. 5 is illustrative of the eight wheel truck assembly of FIG. 2 with eight wheel truck at fully retracted position.

In Veaux et al. the two beam hinge points at C and D in FIG. 1 are positioned such that "means of retraction make the beam come into a position substantially perpendicular to the longitudinal axis of the undercarriage" (line 49, col. 2) whereas, in contrast, in the present invention, it remains, as nearly as possible, substantially parallel to the aircraft longitudinal or fore and aft axis, primarily for aerodynamic load and noise reduction. In other words, the angular relationship between beam and absorber is completely the opposite of Veaux et al. during the retraction/extension phases (see Veaux et al. FIG. 4 and note that during retraction the rotation is counter-clockwise and the rotation is counter-clockwise relative to the shock strut in contrast to the present gear which is clockwise).

Figure 9:
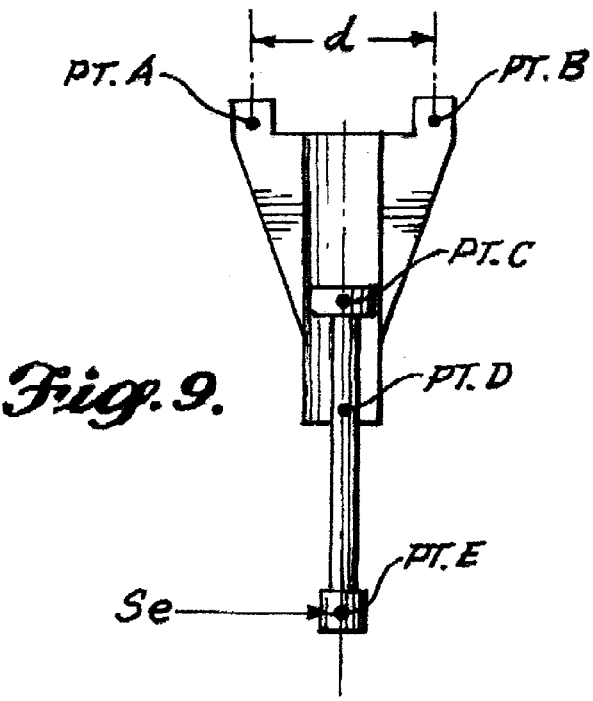
FIG. 9 is illustrative of a typical hydraulic piston and cylinder combination wherein a side load, 'Se' has been introduced at the piston lower end, 'E'.
Figure 11:
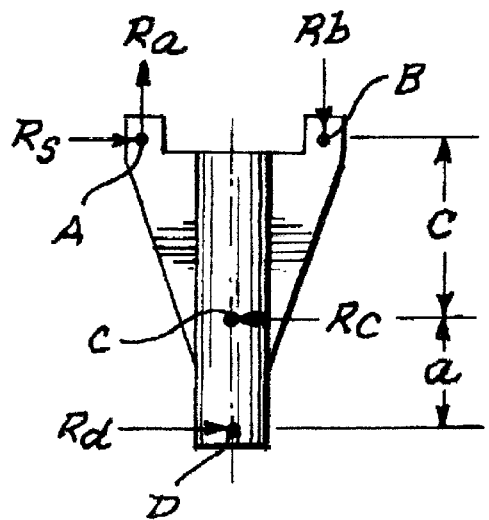
Figure 10:
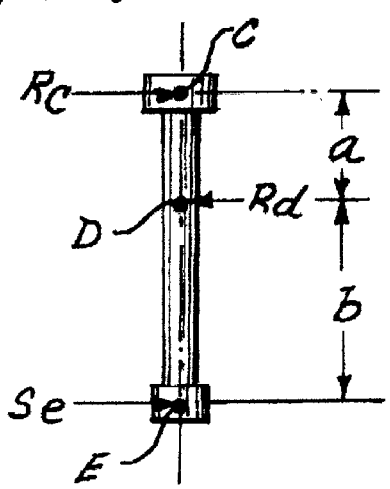
FIG. 10 is illustrative of a free-body diagram of the piston from FIG. 9 showing reaction loads 'Rc' and 'Rd', sustained at the Upper and Lower Bearing locations respectively; and, FIG. 11 is illustrative of a free-body diagram of the cylinder from FIG. 9 showing reaction loads 'Rs', 'Ra' and 'Rb', required to sustain equal and opposite loads 'Rd' and 'Rc' introduced by the piston from FIG. 10.

Veaux et al. requires torque links (line 29–31, col. 4) whereas the present system does not need them (provided of course that issues raised by examining FIGS. 9–11 are satisfied).

The Veaux et al. shock strut could be used in an eight wheel truck but the diametral width would be increased by approximately 40% over a two strut arrangement (all other parameters being equal). See calculations in FIGS. 8A, 8B and 8C.

Figure 3:
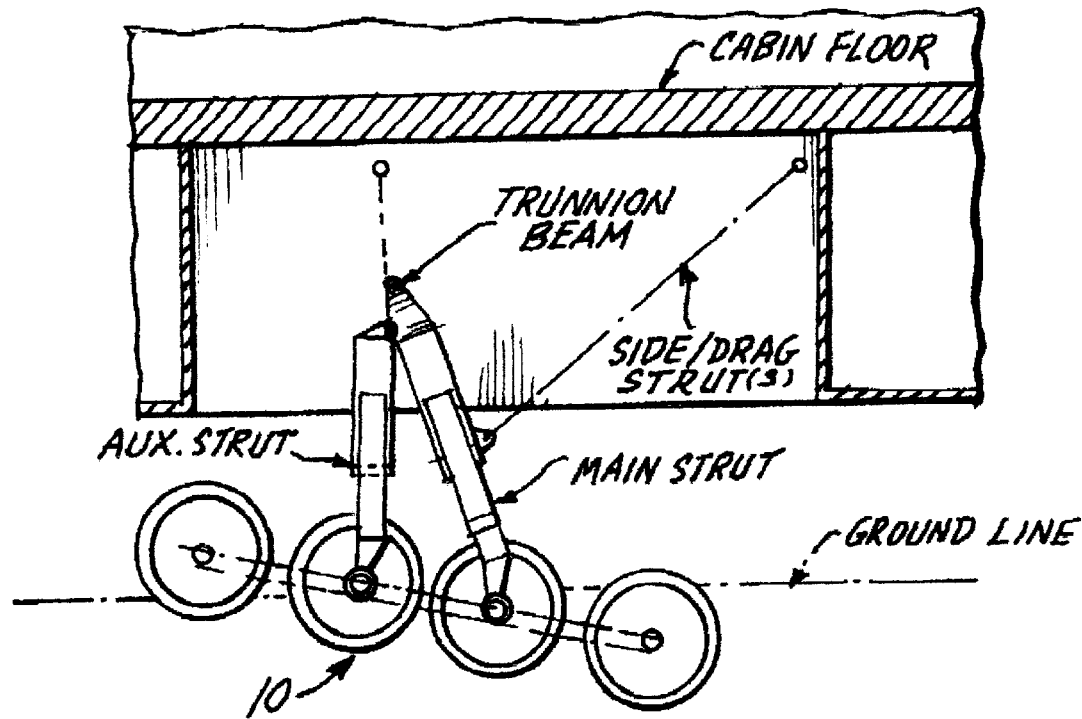
FIG. 3 is illustrative of the eight wheel truck assembly of FIG. 2 in fully extended position.

Veaux et al. uses articulation of the first stage piston to provide pitch control (FIG. 3, item 24) during ground maneuvering whereas in the present system this function is performed by the separate, auxiliary shock strut 2 working in tandem with the second stage 9 of the main shock strut 1 (first stage 8 being fully compressed during ground maneuvers and active during take-off and landing only whereas Veaux et al. is active under all conditions).

U.S. Pat. No. 5,110,068 to Grande et al.

Grande et al. utilizes an auxiliary prop(s) 60, 62 which attaches to the main prop whereas the present system attaches to a trunnion, thus making for a different geometry.

The Grande et al. auxiliary prop main function is to prevent tip-back whereas in the present invention a major portion of landing and ground loads is shared with the main shock absorber, or prop.

Grande et al. requires specifically that the forwardmost wheels contact the ground before the rearwardmost wheels, whereas the present system indicates no preference in this regard, i.e., the aircraft can land on either the forward or the aft wheels simply by reversing the entire gear layout 180 degrees fore and aft.

Grande et al. makes no specific claim that the auxiliary prop can be placed forward of the main prop.

Grande et al. does not specifically assert that the system can reduce noise by minimizing aerodynamic cross-section throughout the kinematic deployment envelope while in flight.

Grande et al. does not show a method that is capable of replacing torque links and, in fact, by studying the design it soon becomes apparent that a side load introduced into the forward (or aft) pair of wheels by an aircraft yaw movement either during landing or ground maneuvers, cannot be resisted unless two changes are made to the hydraulic prop (60). The first is an extreme increase in size. The prop will need to be at least as big as the shock strut to have any chance to sustain the typical loads involved. Second, a minimum of two attachment points, with sufficient distance between them, are required at the prop to shock strut connection. This is so that the resultant hinge moment introduced by the side load can be sustained by suitable reactions. This is best illustrated as shown in FIGS. 9–11 hereinafter described. As can be seen and deduced from these figures, and by calculation, as distance 'd' is reduced to near zero, Reactions at points A and B will rise exponentially to unsustainable magnitudes. And thus, the prop as shown, cannot function as a torque link.

Simply replacing the auxiliary prop with the Veaux et al. system hereinbefore discussed still does not address the above issues.

Replacing the auxiliary prop with the Veaux et al. system is not possible because it would cease to act as Grande et al. intended, namely, as a prop for tip-back prevention. Thus, if Veaux et al. and Grande et al. are combined, it is for all intents and purposes, a new design.

General Discussion of Features of the Present Invention Over the Prior Art

The unique retraction feature of the present invention is impossible to achieve using a 3-bar linkage and shock struts of roughly equal lengths and diameters. This can only be done with a 4-bar linkage. Thus if Veaux et al. features are used in the system of Grande et al., it is still a fundamentally different mechanism in terms of kinematic performance (retraction/extension only) compared to the present system. Furthermore, Grande et al. does not show any unique and novel benefits during the retraction/extension phase of their landing gear whereas both the present system and Veaux et al. provide such in different ways.

DESCRIPTION OF THE PREFERRED EMBODIMENT

Figure 2:
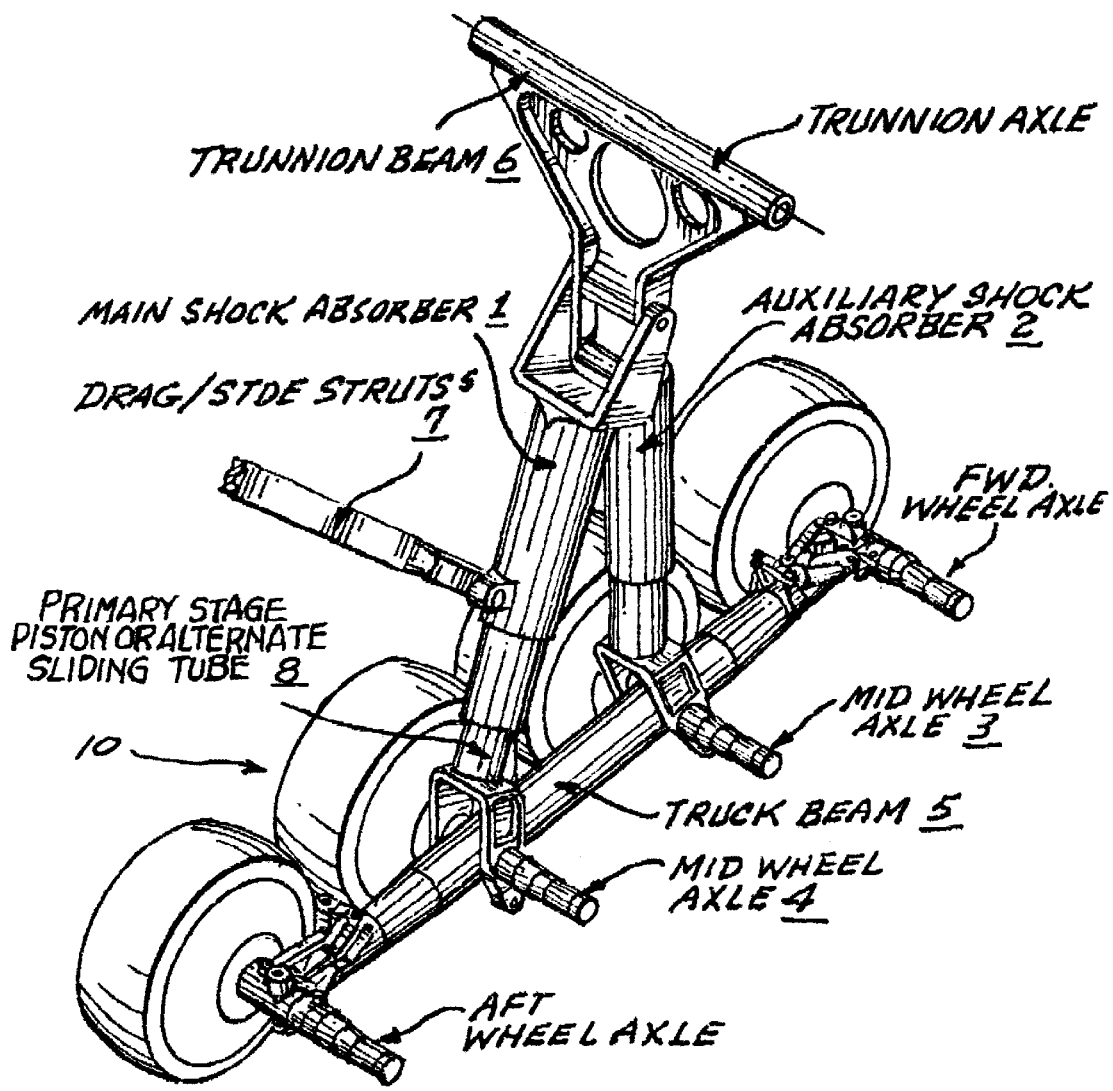
FIG. 2 is an isometric view illustrative of an eight wheel truck assembly having steerable forward and aft axles in accordance with a preferred embodiment of the present invention.

Turning now first to FIG. 2, it will be seen that the present eight wheel truck assembly 10 having steerable forward and aft axles comprises dual shock struts, a primary or main, two-stage shock absorber 1 and a semi-articulating secondary or auxiliary, single-stage shock absorber 2, each of which are mounted using the second 3 and third 4 axles as pivot joints in a four axle, eight wheel truck beam 5. The two shock struts are attached to the aircraft through a rotating trunnion beam 6 at their upper ends and through suitable drag and/or side strut connection(s) 7 at the lower ends of their outer cylinders. Rotating trunnion beam 6 is not required to be fixed as shown but may be adjusted depending on the type of aircraft installation and the desired retraction path (as mentioned herein above for the side and drag strut locations). For example a complete re-alignment of 90° to the fore and aft direction is possible for use in a wing gear installation. Then the trunnion to shock strut axes would also need similar re-alignment and possibly gimballing in the case of the auxiliary strut due to the nature of its motion. It should be noted that optimal side and drag strut locations are dependent on the type of aircraft installation. Furthermore, a wing gear installation could theoretically remove the trunnion member 6 and still function as intended although at the expense of other design parameters. Also, the arrangement shown eliminates the need for torque links (as in FIG. 1) resulting in additional potential weight saving. The use of a two-stage main shock absorber 1 is vital to this invention in that it permits the desired truck beam 5 pitch attitude and "soft" damping loads at the initial contact of tires to ground during landing. This is deemed to be important as increased truck sizes may cause adverse reaction loads during the wheel spin-up phase of landing for example. Furthermore, the dual shock struts are believed to act as inherent truck pitch dampers to minimize the pitching motion of the truck beam following initial ground contact.

The truck pitch attitude prior to landing and for proper retraction into the wheel well can be done by judicious selection of lengths and positioning of the 4-bar kinematic linkage comprised of: the truck beam 5, auxiliary shock strut 2, trunnion beam 6 and main shock strut 1. Fine tuning adjustment of the truck pitch attitude can then be done by length and/or stroke alteration of the primary stage piston 8A. An alternative to the two-stage shock absorber feature of the present eight wheel landing gear which is less weight/ cost effective consists of replacement of the main shock absorber 1 primary stage piston 8A with a sliding tube 8B and effectuating truck pitch position using hydraulics as in the system of FIG. 1. The two techniques of truck pitch control described above can be considered as fixed and flexible methods respectively. The first method using primary stage piston 8A is fixed in the sense that it cannot readily change the truck pitch attitude once each component of the mechanism is in place. On the other hand, the version utilizing sliding tube 8B, being connected to a separate hydraulics control is flexible and can effectuate a range of desired truck pitch attitudes thereby permitting different truck positions for retraction into the wheel well and for landing as an example, thus allowing for optimal design for each condition.

Discussion of FIGS. 9–11

The purpose of this discussion is to show why torque links are required on both the Veaux et al. and Grande et al. patents but not necessarily in the present system in order to further refute any consideration that Grande et al. would inherently absorb some of the sustained yaw loads during a maneuver. The yaw loads to which this discussion refers are those which result in a torque or moment load about the shock strut axis. These loads are typically at their worst when the aircraft negotiates a tight turn while on the ground or lands in a severe side wind condition as the first pair of wheels make contact with the ground. They have a tendency to cause the truck or bogie to rotate or twist generally about a vertical axis with respect to the aircraft.

Referring now to FIG. 9 which is a schematic of a piston/cylinder assembly, typical of a shock absorber, showing a side load introduced at the lower end of the piston, point 'E'. The piston/cylinder Upper Bearing location is at point 'C' while the Lower Bearing location is at point 'D'. The cylinder attachment lugs are indicated as points 'A' and 'B', separated by distance 'd'. It is important to note that side load '$S_e$' is the load which can exist at either auxiliary 2 or main shock absorber 1 to truck beam 5 attachment points. This is as a result of the load conditions discussed previously above, and stems from the unique response of the 4-bar geometry of the present system, whereas in Grande et al. hereinbefore discussed under the prior art, there is no suggestion as to how the design is capable of doing this inherently simply because in the conventional art it is normal to use torque links, and this is shown in Veaux et al. (line 29–31, col. 4) and in FIG. 1 of the present system.

Turning now to FIG. 10, it can be deduced by inference that 'Rd' will always be greater than 'Rc' in magnitude (these are approximate centralized locations of the Lower and Upper Bearings, respectively, which for purposes of this discussion are being considered as point loads along with the other loads and reactions in FIGS. 9 and 11). This is always true in practical landing gear design because a certain distance 'a' is required for proper bearing, seal and structural loading issues. As a simplified example, for purposes of discussion, if distance 'a' were made equal to distance 'b', then 'Rc' would be equal to the side load 'Se' and in turn, equal to one-half of 'Rd'.

Looking at FIG. 11, it can be seen that since 'Rd' is greater than 'Rc', it will therefore produce a net hinge moment about points 'A' and 'B' which must be countered by reaction loads 'Ra' and 'Rb' (reaction load 'Rs', acting at right angles to 'Ra', may be invoked at either or both of points 'A' and 'B' for purposes of maintaining free-body stability). As an example, if distance 'a' were made equal to distance 'c', then:

$$R_a = R_b = \frac{R_d(a+c) - R_c(c)}{d} = \frac{2R_d(c) - R_c(c)}{d} = \frac{(2R_d - R_c)c}{d}$$

Thus, mathematically, since 'Rd' is greater than 'Rc', as the variable 'd' goes to zero, the variables 'Ra' and 'Rb' go to infinity.

Then, the present design requires a practical distance between points 'A' and 'B' in order to be able to sustain loads that in the conventional art are being carried by torque links such as in Veaux et al.

Additional Features

Further features and advantages which result from the present system's unique retraction include:

1. Truck and wheel assembly stays approximately level during all phases of retraction/extension thereby minimizing aerodynamic frontal area and therefore noise, and to a lesser extent, loading on the gear structure. Noise generated by the landing gear during take-off and landing has not been a factor in the past, but recent studies have shown that with the introduction of hushkits and the new generation of quieter engines, other sources of noise have surfaced which were previously masked and one of them is the landing gear. In the future, more stringent regulations will dictate a search for ways to reduce noise. It is believed that minimizing the landing gear frontal area will help this effort.

Figure 6:
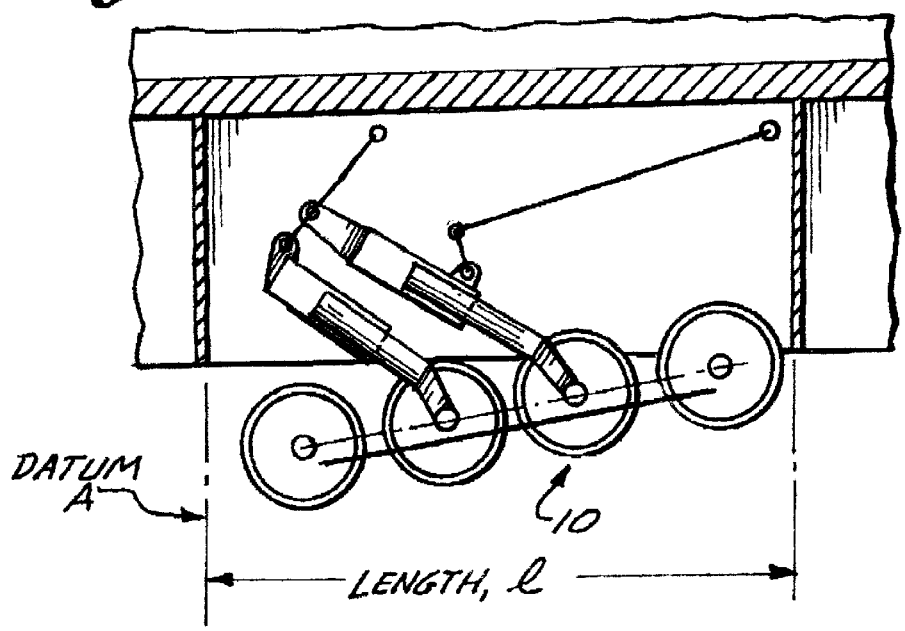
FIG. 6 is illustrative of the eight wheel truck of FIG. 2 but at a transient position approximately mid-way between fully retracted and fully extended positions (typically at the position of minimum clearance of the wheels with respect to the wheel well whose length is shown.
Figure 7:
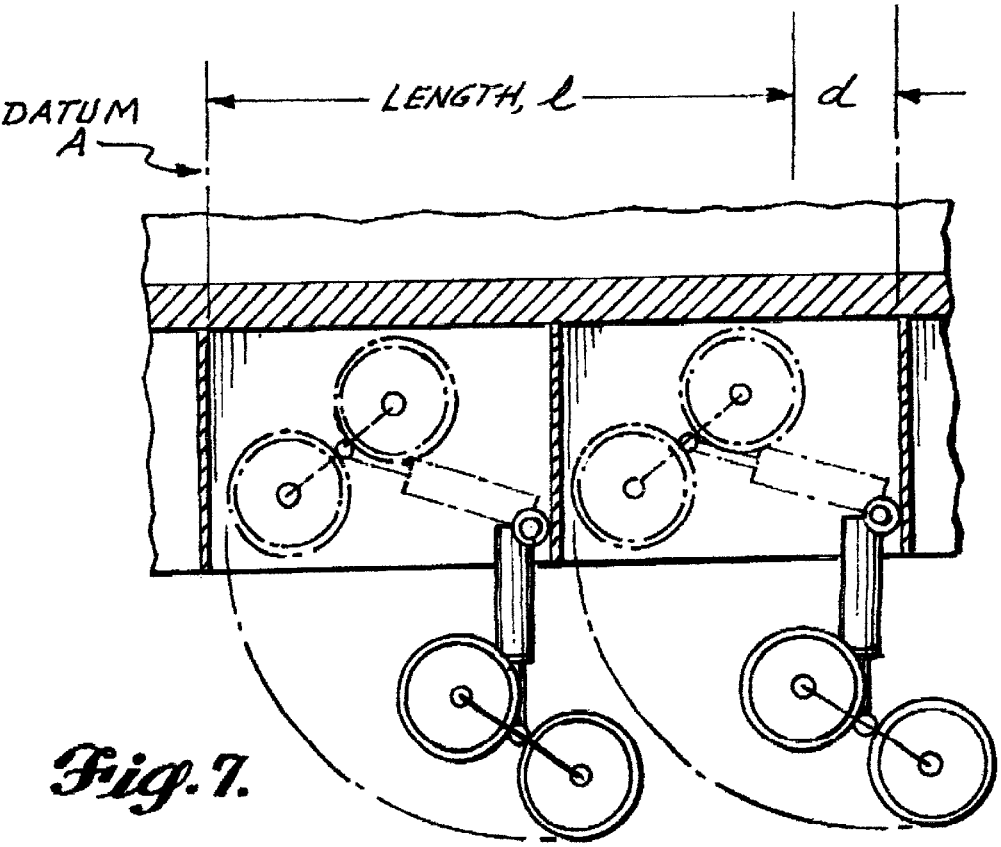
FIG. 7 is illustrative of typical dual, separately mounted, four wheel trucks, shown in side views identical to previous FIGS. 3–6, intended for comparison with those figures and hence has been aligned on a common vertical datum 'A' relative to FIG. 6. Each four wheel truck has a single shock absorber of approximate equal size to those used on the eight wheel design and retracted/extended positions are shown superimposed.

2. Minimum wheel well volume is claimed by the present system specifically for the unique case where two, four-wheel trucks are in-line, for example, in a body gear installation. If FIGS. 6 and 7 are compared, it can be seen that the present system will take up less space for equal wheel and shock strut diameters. Wheel well height/width remains the same but the length, '1' will be reduced by some distance, 'd', which varies based on wheel size used, and where the lengths are compared from a common forward wheel well bulkhead datum 'A'. Numerous studies of the present system indicate that the reason this will always occur is twofold. First, extra space is necessary for an additional trunnion mounting arrangement and secondly, in order to maintain equal wheel well height, it is necessary to rotate the four wheel trucks such that they clear both the cabin floor above and wheel well doors below. Increasing the wheel well height to reduce length is typically unacceptable in good aircraft design since it compromises ground clearance, take-off rotation and cabin cross-section requirements among other things. Furthermore, reduction of wheel well length is a key objective in good aircraft design since it would afford extra volume for the lower cargo hold which is typically found aft of the wheel well in most commercial aircraft of today.

What is claimed is:

1. A landing gear for an aircraft, comprising:

an eight wheel truck having four axles, all axles being substantially in line with each other and each carrying a pair of wheels with the forwardmost and rearwardmost wheels being steerable; and a combination of a two-stage main shock absorber and a single-stage auxiliary shock absorber for mounting said wheel truck to a landing gear support structure on the aircraft, said main and auxiliary shock absorbers being pivotally and separately mounted to said support structure and likewise adjacent the second and third axles respectively of said wheel truck, said combination providing truck pitch control for all conditions of aircraft handling including suitable positioning prior to landing and for retraction into the wheel well.

2. The landing gear according to claim 1, wherein said main and auxiliary shock absorbers are pivotally and separately mounted on a rotating structural trunnion member such that with the inclusion of the truck, these elements comprise a 4-bar linkage such that their kinematic action permits the truck assembly to pitch up and down during aircraft ground, landing and take-off conditions.

3. The landing gear of claim 2, wherein said kinematic action permits the truck assembly to remain parallel or nearly so relative to the aircraft longitudinal axis such that aerodynamic frontal area is kept to a minimum during the extension and retraction phases of landing gear deployment.

4. The landing gear of claim 2, wherein said kinematic action permits the landing gear to be stowed in a reduced volume over that of two, separate, in-line with respect to each other, four-wheel trucks, each with single shock absorber, landing gears.

5. The landing gear of claim 1, wherein said main and auxiliary shock absorbers act to sustain pivoting loads on the truck during aircraft ground maneuvers or aircraft yaw loads at the initial contact of either forwardmost or rearwardmost wheels during landing; pivoting loads being sustained through reactions at the upper and lower bearings of each shock absorber; and in turn, through reactions at the attachment points of each shock absorber to a structural trunnion member or to an aircraft support structure.

6. A landing gear for an aircraft, comprising:

an eight wheel truck having four axles, all axles being substantially in line with each other and each carrying a pair of wheels with the forwardmost and rearwardmost wheels being steerable in some manner;

in combination:

a single stage main shock absorber having an internal sliding tube and a single-stage auxiliary shock absorber for mounting said wheel truck to a landing gear support structure on an aircraft, said main and auxiliary shock absorbers being pivotally and separately mounted to said support structure and likewise to or near the second and third axles respectively of said wheel truck, said combination providing truck pitch control for all conditions of aircraft handling including suitable positioning prior to landing and for retraction into the wheel well;

said main and auxiliary shock absorbers pivotally and separately mounted on a rotating structural trunnion member and including said eight wheel truck for providing a 4-bar linkage and kinematic action; and, said internal sliding tube being adjustable during various phases of the aircraft handling.

* * * * *